United States Patent Office 2,874,778
Patented Feb. 24, 1959

2,874,778

HYDRAULIC CEMENTS HAVING AN EXTENDED THICKENING TIME AND PROCESSES EMPLOYING THE SAME

Herman H. Kaveler, Bartlesville, Okla., assignor to Phillips Petroleum Company, a corporation of Delaware No Drawing. Application August 14, 1952
Serial No. 304,362

12 Claims. (Cl. 166—31)

This invention relates to cements having retarded rates of hydration or set, to slurries of such cement, and to the method of making these slurries. The cement with which the invention is concerned is preferably a Portland or Portland-type cement. In another aspect it relates to any hydraulic cement composition in a dry form, or with added water in an aqueous slurry form, which when in the form of an aqueous slurry has a retarded initial set or extended or retarded thickening time and/or a reduced water-loss to adjacent porous formations, due to the addition of a minor but effective amount of acid carboxyalkyl oxycellulose selected from the group consisting of carboxymethyl oxycellulose ether, alpha carboxyethyl oxycellulose ether, and beta carboxyethyl oxycellulose ether, or a salt of the same, this invention relating first to said compositions of matter, second to processes of compounding said compositions, and third to processes for using said compositions in the arts of cementing wells, sealing porous formations during the drilling of wells, cementing casings in the well, squeeze cementing, plugging the well or the earth formation adjacent the same, and grouting or sealing crevices, cracks or holes in man-made formations such as buildings, foundations, dams, breakwaters or concrete and masonry structures, in some instances the cracks or fractures already existing before the slurry is pumped into them, and in some cases the pressure of the slurry being pumped into or against the surface of said formation or structure forming by its pressure the cracks or fractures to be filled.

The present application is a continuation-in-part of my copending U. S. patent application Serial No. 47,555 of Herman H. Kaveler, filed September 2, 1948 (now abandoned), for "Retarded Cement and Method of Making."

Among the objects of the invention is the provision of a cement having a retarded rate of hydration, or retarded set, as it will hereinafter be termed, particularly at elevated temperatures up to and above 300° F. and/or at high pressures up to and above 20,000 pounds per square inch, such as are encountered in cementing deep wells.

One object of the present invention is to provide a suitable hydraulic cement aqueous slurry, and suitable processes employing the same, for cementing casings in wells, for squeeze cementing in wells, and for grouting cracks, fractures or voids, in natural formations, such as in wells, or in man-made formations such as dams, breakwaters, walls and massive foundations and structures of all types.

Another object of this invention is to provide a dry hydraulic cement powder which is a novel composition of matter, and which may be mixed with water to form an aqueous cement slurry which is a novel composition of matter and which has at least one of the following useful properties: a relatively retarded time of initial set, a relatively extended thickening time during which it is pumpable, and/or a relatively low water-loss to porous formations with which it may come in contact during cementing or grouting operations.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example, a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it out the bottom of the casing and upward around the outer surface of the casing, or through perforations in the lower end of the casing into the formation sought to be sealed, the slurry is required to pass through narrow channels and small openings. Successful placement of the slurry, therefore, requires that the slurry shall remain fluid and pumpable at high temperatures for several hours before it begins to harden. However, after the slurry has been pumped into place, it is desirable to have the hydration or set proceed at a rate at which the slurry will attain its final set and develop considerable strength within a reasonable time, say within a few days. It would be even more desirable to have it attain its final set in about 24 hours but often this is not attainable.

As pointed out in the preceding paragraph, the most important function of the hydraulic cement aqueous slurry of the present invention is that it has a retarded time of initial set, and therefore remains pumpable for a relatively long period of time and a relatively long period of time passes before it thickens, yet it will attain a final set of some considerable strength within a reasonable length of time so that the well-drilling crew is not unduly delayed, but can get back to work and proceed to continue drilling the well bore, or to perforate the casing and/or cement with the usual gun perforating tools known to the art. All types of acid carboxyalkyl oxycellulose selected from the group consisting of carboxymethyl oxycellulose ether, alpha carboxyethyl oxycellulose ether, and beta carboxyethyl oxycellulose ether, and any salt of the same, have sufficient set retarding and thickening time extending properties to be used commercially in the practice of the present invention, and when carefully prepared so that a relatively high degree of substitution has occurred with relatively low amounts of degradation of the cellulose molecules, a secondary effect is achieved, which, while not as important as the first mentioned effect of delaying the time of initial set and extending the thickening time of the cement, is also of considerable value in cementing oil wells, namely, the aqueous cement slurry containing the minor but effective amount of acid carboxyalkyl oxycellulose selected from the group consisting of carboxymethyl oxycellulose ether, alpha carboxyethyl oxycellulose ether, and beta carboxyethyl oxycellulose ether, or a salt of the same has a reduced tendency to lose water to porous formations across the surface of which it must pass in going to its intended position in the well. Many failures in prior art oil well cementing jobs, which have been accredited to the premature setting of the cement, are thought to be caused actually by the formation dehydrating the cement slurry, thereby rendering the cement immobile before it reaches the desired position. As the practice of using scrapers to clean the mud off the well walls to obtain a better cement-formation bond becomes more frequently used, the better the formation will absorb water from the cement slurry causing it not only to plug the annulus between the casing and the wall of the well, but also to have insufficient water for normal hydration upon setting, and the greater will become the realization of the need for low water-loss cements.

Everything which is said applying to natural formations in wells applies also in some degree to man-made formations being grouted, and the word "formation" as used herein is regarded as generic to natural earth formations, geological formations, and man-made formations such as structures.

In the prior art of squeeze cementing in wells and in forcing grout into the cracks and crevices in fractured foundations or the like, it has been the practice to employ as a breakdown agent, water or drilling mud, which is forced ahead of the aqueous hydraulic cement slurry into the formation to split the same and enlarge the fractures or cracks to be filled, because if ordinary hydraulic cement aqueous slurry were employed it would lose water to the formation or foundation so rapidly that the cement slurry would start to set before much penetration has been effected. When a relatively low water-loss hydraulic cement aqueous slurry is employed, the amount of breakdown agent can be greatly reduced, or entirely eliminated, because the low water-loss cement slurry will penetrate to much greater distances before losing sufficient water to be caused to set by this dehydration. When squeeze cementing in oil wells is involved, in which it is desired to force a thin disk or layer of these cement slurries out into a natural earth formation along pre-existing or pressure made fractures, in order to separate an oil sand from some other sand at the general vicinity where the oil well intersects the same, it is especially advantageous to use a relatively low water-loss cement slurry as breakdown agent because then less water is likely to be absorbed by the oil formation where it might cause a reduction in the present or future amount of production of oil. Some oil-bearing formations contain bentonitic materials which swell when they encounter water, and if excess water is injected into such formations, the swelling of the bentonitic material may prevent future production of oil.

A suitable cementing process which may be employed in my invention is that disclosed in my U. S. Patents 2,795,507 and 2,795,508. The U. S. patents now in class 166, Wells, subclass 22, Cementing or Plugging, disclose a number of other suitable cementing processes which may be employed in my invention.

By hydraulic cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic cements. Hydraulic cements include hydraulic limes, grappier cements, puzzolan cements, natural cements, and Portland cements. Puzzolan cements include slag cements made from slaked limes and granulated blast furnace slag. Because of its superior strength Portland cement is preferred among the hydraulic cements, but as the art of cements recognizes hydraulic cements as a definite class, and as results of value may be obtained with acid carboxyalkyl oxycellulose selected from the group consisting of carboxymethyl oxycellulose ether, alpha carboxyethyl oxycellulose ether, and beta carboxyethyl oxycellulose ether, or a salt of the same, with any member of that class, it is desired to claim all hydraulic cements. In addition to the ordinary construction grades of Portland cement or other hydraulic cements, modified hydraulic cements and Portland cements designated as high-early-strength, heat-resistant cement, and slow-setting cement may be used in the present invention.

In most oil well cementing and grouting operations it is generally desirable to use neat cement for added strength, but obviously it is always possible to add to the hydraulic cement, water and acid carboxyalkyl oxycellulose or a salt of the same, any desired amount of an inert granular filling material aggregate such as sand, ground limestone, or any of the other well known inert or even cementitious aggregates, as long as simple tests show the amount added does not reduce the compressive strength after final set below the desired value. For example, in plugging porous formations, bentonite or other clays are often added to hydraulic cement aqueous slurries, as taught by U. S. Patent 2,041,086 of May 19, 1936, or iron oxide or barium sulfate is added to make heavy cement. Any of these aggregates can be added to the aqueous hydraulic cement slurry of the present invention in the usual proportions used in the prior art.

In operations in previously uncased wells it is often desirable to use neat cement in the practice of the present invention, because inert filling material may automatically become detached from the walls of the well, and will tend to mix with and dilute the slurry to such an extent that it is undesirable to add any filling material to the slurry being forced into the well. It is customary in the prior art when cementing to make simple tests as to the time of set, compressive strength, etc., on samples of the proposed mix.

The amount of water added to the cement of the present invention is not critical, it being obvious that sufficient water should be added to form a pumpable slurry, and that when the slurry becomes pumpable no further water need be added. One advantage of the slurry of the present invention when a relatively less degenerated acid carboxyalkyl oxycellulose selected from the group consisting of carboxymethyl oxycellulose ether, alpha carboxyethyl oxycellulose ether, and beta carboxyethyl oxycellulose ether, or a salt of the same is used is that it is a low water-loss slurry, and therefore it is not necessary to add much excess water over the amount making the slurry pumpable as a reserve for expected losses, which excess water might tend to reduce the final compressive strength of the cement.

It has been found that all hydraulic cements, especially Portland and Portland-type cement aqueous slurries can be retarded in setting time, the time of thickening extended, and in some cases the water-loss tendencies retarded, so that they meet all the above requirements for the satisfactory cementing of deep wells and like operations by the addition of a minor but effective amount of from about 0.30 to 5 percent by weight of the dry hydraulic cement of acid carboxyalkyl oxycellulose selected from the group consisting of carboxymethyl oxycellulose ether, alpha carboxyethyl oxycellulose ether, and beta carboxyethyl oxycellulose ether, or the metal, ammonium or organic base, or other salts of acid carboxyalkyl oxycellulose selected from the group consisting of carboxymethyl oxycellulose ether, alpha carboxyethyl oxycellulose ether, and beta carboxyethyl oxycellulose ether, without seriously affecting the other desirable properties of the cement. It is preferred at present to use the sodium or potassium salts of acid carboxyalkyl oxycellulose selected from the group consisting of carboxymethyl oxycellulose ether, alpha carboxyethyl oxycellulose ether, and beta carboxyethyl oxycellulose ether merely because these salts are readily available commercially and therefore relatively inexpensive. However, good results will be obtained using any other alkali metal salt, such as the lithium, rubidium, caesium and other rare alkali metal salts, or the ammonium or organic base salts of acid carboxyalkyl oxycellulose selected from the group consisting of carboxymethyl oxycellulose ether, alpha carboxyethyl oxycellulose ether, and beta carboxyethyl oxycellulose ether, all of which are water-soluble. Typical organic base salts that can be used are those derived from ammonia such as methyl amine, dimethyl amine and quaternary ammonium bases; also pyridine, morpholine and the like. In addition the alkaline earth metal salts such as the barium, calcium, strontium and magnesium, and the heavy metal salts such as the aluminum, copper, iron, lead, silver, mercury, nickel, and all other salts of acid carboxyalkyl oxycellulose selected from the group consisting of carboxymethyl oxycellulose ether, alpha carboxyethyl oxycellulose ether, and beta carboxyethyl oxycellulose ether (which are probably insoluble in water but which hydrolyze in the hydraulic cement aqueous slurry which is an aqueous alkaline solution) are just as useful in the invention in the aqueous hydraulic cement slurry which is quite alkaline. Acid carboxyalkyl oxycellulose selected from the group consisting of carboxymethyl oxycellulose ether, alpha carboxyethyl oxycellulose ether, and beta carboxyethyl oxycellulose ether, and all of their salts, whether such salt is formed in the aqueous hydraulic cement slurry by hydrolysis of some water-insoluble salt, are all valuable in amounts of 5 percent or less, based on weight of dry cement, in retarding the set of aqueous hydraulic cement slurry, especially at the temperature and pressure encountered in cementing a well, and in many instances the acid carboxyalkyl oxycellulose is selected from the group consisting of carboxymethyl oxycellulose ether, alpha carboxyethyl oxycellulose ether, and beta carboxyethyl oxycellulose ether, or salt, will decrease the water-loss from said aqueous hydraulic cement slurry to porous formations encountered in the well.

While 0.30 to 5 percent of acid carboxyalkyl oxycellulose selected from the group consisting of carboxymethyl oxycellulose ether, alpha carboxyethyl oxycellulose ether, and beta carboxyethyl oxycellulose ether, or their salts by weight of the dry hydraulic cement will give valuable results, it has been found that from 0.30 to 1 percent is the most preferred range in wells less than 14,000 feet deep and less than 300° F., the use of 0.5 percent being particularly effective in such wells, and the percentage above 1 percent being chiefly of value in still deeper and hotter wells.

The term acid carboxyalkyl oxycellulose selected from the group consisting of carboxymethyl oxycellulose ether, alpha carboxyethyl oxycellulose ether, and beta carboxyethyl oxycellulose ether, and their salts covers all such ethers however produced.

Some of the same carboxyalkyl oxycellulose described in Scarth, 2,556,222, of June 12, 1951, was used in the examples of the present application, and may be prepared for the present use in the same manner.

I prefer to use a carboxyalkyl oxycellulose in which the degree of substitution of carboxyl groups is about 0.3 to about 0.8 and the degree of substitution of carboxymethyl groups is about 0.3 to about 0.8 per cellulose unit and which has undergone substantially no degradation, or only a minor degree of degradation, during the oxidation. However, these limits are not critical and beneficial results may be obtained with compounds that fall outside these limits as long as the selected salt is water soluble. A suitable method for producing a carboxymethyl oxycellulose ether is by the action of chloroacetic acid on an oxycellulose which has not been degraded or in which the amount of degradation is negligible. The two carboxyethyl oxycelluloses may be prepared by the reaction of acrylonitrile on the oxidized cellulose followed by hydrolysis.

A suitable method for the preparation of a non-degraded oxycellulose is described in two articles in the Journal of the American Chemical Society 64, 121 and 127 (1942). The acrylonitrile process for the making of carboxyethylcellulose compounds is fully described in U. S. Patents No. 2,332,048 and No. 2,349,797.

However, any method may be used in the preparation of these carboxyalkyl oxycellulose ethers as long as there is not excessive degradation and the proper degree of oxidation or carboxyalkylation is effected. The method of preparation is not a part of this invention.

The various salts may be made by treating the free acid with a soluble salt of the preferred metal ion, or by any other suitable reaction.

A sample of the sodium salt of carboxymethyl oxycellulose ether used in these tests was prepared in the following way. 120 grams of 11.4 percent oxycellulose (11.4% carboxyl content) was dissolved in a caustic solution of 660 grams of sodium hydroxide in 1598 grams of distilled water. After the solution had stood for 5 hours, it was cooled to 54° F. and a solution of 648 grams of chloroacetic acid in 180 ml. of water was slowly added with stirring to the cool basic oxycellulose. The reaction mixture was allowed to stand at room temperature for 24 hours.

The sodium carboxymethyl oxycellulose ether was precipitated by pouring the solution into methyl alcohol. The precipitate was filtered and washed with acetone. The precipitate was then dissolved, precipitated with methyl alcohol and washed with acetone. This procedure was repeated three more times and finally the precipitate was washed several times with absolute ethyl alcohol and dried in an oven at 110° F. The sodium carboxymethyl oxycellulose ether was a white, fluffy material, readily soluble in water.

It was determined by analysis that, for the sodium carboxymethyl oxycellulose ether, the degree of carboxymethyl substitution was 0.56 carboxymethyl groups per cellulose unit, and the degree of carboxyl substitution was 0.45.

The acid carboxyalkyl oxycellulose selected from the group consisting of carboxymethyl oxycellulose ether, alpha carboxyethyl oxycellulose ether, and beta carboxyethyl oxycellulose ether can be liberated from an aqueous solution of the sodium salt by addition of hydrochloric acid. The various metal salts of carboxyalkyl oxycellulose may be prepared by the addition of a salt of the desired metal to an aqueous solution of the free acid followed by precipitation by the addition of alcohol, acetone or a similar non-polar solvent.

Valuable results are also obtained with the water-soluble metal and ammonium or organic base salts of carboxyalkyl oxycellulose selected from the group consisting of carboxymethyl oxycellulose ether, alpha carboxyethyl oxycellulose ether, and beta carboxyethyl oxycellulose ether, especially the alkali or alkaline earth metal salts. The preferred alkaline earth metals are calcium, barium, strontium and magnesium, but other metal salts may be used which hydrolyze in alkaline solutions. Such other metal salts include aluminum, iron, copper lead, silver, mercury, nickel, zinc and other heavy metals.

Portland cement is a mixture of complex silicates and aluminates of calcium containing excess lime. The setting or hardening is a result of the hydration or other chemical readjustments of the various components. Generally speaking, three periods in the set are recognized: "initial," "final" and "hardening" sets. The initial set normally occurs at ordinary temperature in from one to two hours after the mixing, the final set two to five hours later and the hardening continues for an indefinite time but it is substantially complete in about 30 days.

The initial set is said to have occurred when a cement slurry has lost its plasticity to such a degree that the two pieces of a broken specimen will not unite to form a homogeneous mass when placed in close contact. The individual grains of a cement slurry must remain undisturbed in intimate contact with each other for a time before the initial set occurs in order to produce a coherent mass. Agitation during the latter part of the period of initial set will prevent the cement from hardening properly to the desired homogeneous, coherent mass.

In order to form a perfect seal in cementing wells, it is necessary that the cement be placed before the initial set occurs and it is desirable that it be placed and allowed to stand for a short period before the initial set begins. With the equipment available, there is a limit to the time in which it is possible to mix a cement and pump it into the bottom of the well and up around the casing to the location desired.

Another reason it is necessary to have the cement in place before the initial set begins is that the viscosity rises as the setting progresses. This increases the difficulty of pumping and is undesirable because of the added strain on the pumping equipment.

It is possible to retard the rate of set, within narrow limits, by increasing the alumina content of the cement, but this method is not widely used because of the high cost of high alumina cements and the limited effective range. The rate of set can be retarded also by increasing the amount of water present in the mix. However, above about 35 to 50 percent water, based on the weight of dry cement, increased amounts of water will result in weaker cement and there is no way of knowing exactly how much dilution will result from water encountered in the well. Addition of small amounts of gypsum, or calcium sulfate, will result in a retarded rate of set, but an excess will increase the rate and may cause the cement to disintegrate or be weakened. It is therefore highly desirable that a retarded cement such as mine be available for cementing work.

The most convenient method of using acid carboxyalkyl oxycellulose selected from the group consisting of carboxymethyl oxycellulose ether, alpha carboxyethyl oxycellulose ether, and beta carboxyethyl oxycellulose ether, or a salt of the same in cement is to run the same and the hydraulic cement through a rotary mixer to produce intimate mixing and later add water to form a fluid slurry. However, this cellulose derivative may be added directly to the cement and water at the time of mixing at the well, or may be dissolved in the water with which the cement is mixed, with substantially the same result. The method of mixing is not critical as long as a somewhat uniform mixture is produced.

The rate of hydration or set of cement is ordinarily increased by an increase of temperature. Since the bottom hole temperature in the well may be considerably higher than the atmospheric temperature, it is desirable that a method such as I have described be available for use in cementing of oil wells. My method is effective at elevated temperatures as well as at ordinary atmospheric temperatures, because obviously a set retarding agent operative at atmospheric temperatures will also retard the set at higher temperatures.

While it is not desired to limit the present invention by any theory of operation and while the scope and validity of the claims do not depend upon the validity of any theory of operation, it is believed helpful in understanding the invention to think of the acid carboxyalkyl oxycellulose selected from the group consisting of carboxymethyl oxycellulose ether, alpha carboxyethyl oxycellulose ether, and beta carboxyethyl oxycellulose ether or a salt of the same temporarily absorbing so much of the water that the Portland cement is only slowly able to obtain enough water to make its initial set, whereby the initial set of the cement is greatly retarded. Finally the Portland cement particles take the water away from the water-soluble cellulose particles and attain an initial and then a final set with suitable strength in the cement for use in oil well cementing operations.

The prior art United States Patent 2,427,683 of September 23, 1947, to Norman C. Ludwig for "Retarded Cement and Method of Making," teaches that the setting time of an aqueous slurry of hydraulic cement (such as Portland cement and water) used in cementing a well can be retarded for about three hours by adding from 0.5 to 0.75 percent by weight of the dry cement of at least one of the group consisting of carboxymethylcellulose and salts of carboxymethylcellulose and/or hydroxyethylcellulose; acid carboxymethylcellulose, the sodium salts of the same, the alkali metal salts, the ammonium salts and other metal salts such as the alumina, iron, copper, lead, silver, mercury, nickel and similar salts of carboxymethylcellulose, can all be used because those which are not soluble in water will hydrolyze and become soluble in the hydraulic cement slurry which is always an alkaline aqueous slurry.

The materials suggested by said Ludwig patent are acid carboxymethylcellulose and salts of the same and/or hydroxyethylcellulose, and no acid carboxyalkyl oxycellulose nor salt of the same is mentioned because none were known that would be suitable.

EXAMPLE I

A neat Portland cement aqueous slurry having a density of 14 pounds per gallon was tested without any additive, and with 1 percent; 0.75 percent; 0.50 percent; 0.25 percent and 0.10 percent respectively of the weight of the dry cement of sodium carboxyethyl cellulose (abbreviated NaCEC in Table I below). To furnish a comparison a similar 1 percent of hydroxyethylcellulose (HEC) and 1 percent; 0.25 percent and 0.05 percent of sodium carboxy-

*Table 1*

| Test No. | Additive Used | | Viscosity of slurry | Setting Time, Hrs. | | Compressive Strength, p. s. i. | |
|---|---|---|---|---|---|---|---|
| | Name | Percent wt. of dry cement | | Room Temperature | 200° F. | Room Temperature | 200° F. |
| 1 | none | 0 | fluid | 4.4 | 1.6 | 1,856 | 1,523 |
| 2 | NaCMC | 1 | Very viscous | 9.8 | | 767 | |
| 3 | NaCMC | 0.25 | viscous | 4.8 | 3.6 | 1,588 | 1,051 |
| 4 | NaCMC | 0.05 | fluid | 4.5 | | 1,623 | |
| 5 | HEC | 1 | do | 32 to 48 | | 1,227 | |
| 6 | NaCEC | 1 | do | >72 | 48 | | |
| 7 | NaCEC | 0.75 | do | 211 | 25 | | |
| 8 | NaCEC | 0.50 | do | 68 | 10.8 | | |
| 9 | NaCEC | 0.25 | do | 18.6 | 4.3 | | |
| 10 | NaCEC | 0.10 | do | 7.0 | 2.4 | 2,685 | 2,140 |
| 11 | AlCMC | 1 | viscous | 5.3 | | 744 | |
| 12 | NaCMOC | 1 | slightly viscous | 72 | | | |
| 13 | NaCMOC | 0.25 | fluid | | 12 to 22 | | 961 |
| 14 | NaCMOC | 0.1 | do | 5.3 | | 1,902 | |
| 15 | NaOC | 1 | Viscous | >32 | | | |
| 16 | NaOC | 0.1 | slightly viscous | 7.4 | 3.0 | 1,970 | 1,712 |
| 17 | BaOC | 1 | fluid | 4.4 | | 1,825 | |
| 18 | MC | 1 | do | 5.1 | | 1,746 | |
| 19 | MHEC | 1 | do | 22 to 24 | | 2,004 | |
| 20 | NaSEC | 1 | slightly viscous | 22 to 48 | | 1,662 | |
| 21 | NaSEC | 0.25 | fluid | 7.3 | | 1,672 | |
| 22 | NaSBC | 1 | do | >48 | | | |
| 23 | NaSBC | 0.1 | do | 6.6 | | 1,911 | |
| 24 | KCS | 1 | do | >32 | | | |
| 25 | KCS | 0.1 | do | 7.5 | | 1,665 | | methylcellulose (NaCMC) in the same slurry is also reported. Numbers 1 to 6, 11, 12, 14, 15, 18 to 20, 22 and 24 of these tests were first reported to the U. S. Patent Office in my application Serial No. 47,555, filed September 2, 1948 (now abandoned), in Table II thereof.

These tests include tests on aluminum carboxymethylcellulose (AlCMC) potassium cellulose sulfate (KCS), sodium and barium oxycellulose (NaOC and BaOC), methylcellulose (MC), methyl hydroxyethylcellulose mixed ether (MHEC), sodium carboxymethyl oxycellulose ether (NaCMOC), sodium sulfobenzylcellulose (NaSBC) and sodium sulfoethylcellulose (NaSEC).

While numerous examples of the invention have been given for purposes of illustration, the invention is not limited thereto.

Having described my invention, I claim:

1. A cement consisting essentially of a major portion of a hydraulic cement mixed with 0.25 to 5 percent by weight of the dry hydraulic cement of a water-soluble setting time increasing agent selected from the group consisting of acid carboxymethyl oxycellulose ether, acid alpha carboxyethyl oxycellulose ether, acid beta carboxyethyl oxycellulose ether, and salts of said acids.

2. A cement consisting essentially of a major portion of a Portland cement mixed with 0.3 to 1 percent by weight of the dry hydraulic cement of a setting time increasing agent consisting of acid carboxymethyl oxycellulose ether and salts of said acid, in which the degree of substitution of the carboxyl groups and of the carboxymethyl groups are both from 0.3 to 0.8.

3. A cement consisting essentially of a major portion of a Portland cement mixed with 0.3 to 1 percent by weight of the dry hydraulic cement of a water-soluble setting time increasing agent consisting of acid carboxyethyl oxycellulose ether and salts of said acid.

4. A cement consisting essentially of a major portion of a Portland cement mixed with about 0.25 percent by weight of the dry hydraulic cement of a setting time increasing agent consisting of sodium carboxymethyl oxycellulose ether, in which the degree of substitution of the carboxyl groups and of the carboxymethyl groups are both from 0.3 to 0.8.

5. A hydraulic cement aqueous slurry having a low viscosity and extended setting time consisting essentially of a major portion of a hydraulic cement mixed with 0.25 to 5 percent by weight of the dry hydraulic cement of a water-soluble setting time increasing agent selected from the group consisting of acid carboxymethyl oxycellulose ether, acid alpha carboxyethyl oxycellulose ether, acid beta carboxyethyl oxycellulose ether, and salts of said acids, and sufficient water to make said slurry fluid.

6. A hydraulic cement aqueous slurry having a low viscosity and extended setting time consisting essentially of a major portion of a Portland cement mixed with 0.3 to 1 percent by weight of the dry hydraulic cement of a setting time increasing agent consisting of acid carboxymethyl oxycellulose ether and salts of said acid, in which the degree of substitution of the carboxyl groups and of the carboxymethyl groups are both from 0.3 to 0.8 and sufficient water to make said slurry fluid.

7. A hydraulic cement aqueous slurry having a low viscosity and extended setting time consisting essentially of a major portion of a Portland cement mixed with 0.3 to 1 percent by weight of the dry hydraulic cement of a water-soluble setting time increasing agent consisting of acid carboxyethyl oxycellulose ether and salts of said acid, and sufficient water to make said slurry fluid.

8. A hydraulic cement aqueous slurry having a low viscosity and extended setting time consisting essentially of a major portion of a Portland cement mixed with about 0.25 percent by weight of the dry hydraulic cement of a setting time increasing agent consisting of sodium carboxymethyl oxycellulose ether in which the degree of substitution of the carboxyl groups and of the carboxymethyl groups are both from 0.3 to 0.8 and sufficient water to make said slurry fluid.

9. In the method of cementing a casing in a well which comprises pumping a hydraulic cement aqueous slurry into the annular space between the casing and the borehole, the step of adding a water-soluble setting time increasing agent selected from the group consisting of acid carboxymethyl oxycellulose ether, acid alpha carboxyethyl oxycellulose ether, acid beta carboxyethyl oxycellulose ether, and salts of said acids, the amount of said agent added being in the range of 0.25 to 5% by weight of dry hydraulic cement.

10. In the method of cementing a casing in a well which comprises pumping a hydraulic cement aqueous slurry into the annular space between the casing and the borehole, the step of adding a setting time increasing agent selected from the group consisting of acid carboxymethyl oxycellulose ether and salts of said acid, in which the degree of substitution of the carboxyl groups and of the carboxymethyl groups are both from 0.3 to 0.8.

11. In the method of cementing a casing in a well which comprises pumping a hydraulic cement aqueous slurry into the annular space between the casing and the borehole, the step of adding a water-soluble setting time increasing agent selected from the group consiting of acid carboxyethyl oxycellulose ether and salts of said acid.

12. In the method of cementing a casing in a well which comprises pumping a hydraulic cement aqueous slurry into the annular space between the casing and the borehole, the step of adding sodium carboxymethyl oxycellulose ether, in which the degree of substitution of the carboxyl groups and of the carboxymethyl groups are both from 0.3 to 0.8, the amount of said ether added being about 0.25% by weight of dry hydraulic cement.

References Cited in the file of this patent

UNITED STATES PATENTS

| | | |
|---|---|---|
| 2,427,683 | Ludwig | Sept. 23, 1947 |
| 2,471,632 | Ludwig | May 31, 1949 |
| 2,556,222 | Scarth | June 12, 1951 |

OTHER REFERENCES

Handbook of Chemistry and Physics, Hodgman, C. D. (editor), 28th ed., Chemical Rubber Publishing Co., Cleveland, Ohio (1944), page 574.

Identification of Organic Compounds, by Shriner and Fuson, 1948 edition, New York, John Wiley & Sons, Inc., pages 66 and 67.

Mellor's Modern Inorganic Chemistry, by Parkes and Mellor, 1939 edition, London, Longman's, Green and Co., pages 213, 220, 221.